US008974289B2

(12) United States Patent
Allen et al.

(10) Patent No.: US 8,974,289 B2
(45) Date of Patent: Mar. 10, 2015

(54) INTEGRATING SOCIAL CONTACT IDENTIFIERS INTO WAGERING GAMES

(71) Applicant: WMS Gaming, Inc., Waukegan, IL (US)

(72) Inventors: Jeffrey L. Allen, Naperville, IL (US); Damon E. Gura, Chicago, IL (US); Jeremy M. Hornik, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 28 days.

(21) Appl. No.: 13/717,222

(22) Filed: Dec. 17, 2012

(65) Prior Publication Data

US 2013/0150150 A1 Jun. 13, 2013

Related U.S. Application Data

(63) Continuation of application No. 12/678,206, filed as application No. PCT/US2008/077310 on Sep. 23, 2008, now Pat. No. 8,360,862.

(60) Provisional application No. 60/974,626, filed on Sep. 24, 2007.

(51) Int. Cl.
*A63F 13/00* (2014.01)
*G07F 17/32* (2006.01)

(52) U.S. Cl.
CPC ............ *G07F 17/32* (2013.01); *G07F 17/3218* (2013.01); *G07F 17/3281* (2013.01)
USPC ................................................ 463/20; 463/16

(58) Field of Classification Search
CPC ............ G07F 17/3272; G07F 17/3274; G07F 17/3276; G07F 17/3279; G07F 17/3281
USPC ...................................................... 463/16, 20
See application file for complete search history.

(56) References Cited

U.S. PATENT DOCUMENTS 5,470,079 A 11/1995 LeStrange et al.
5,823,879 A 10/1998 Goldberg et al.
(Continued)

FOREIGN PATENT DOCUMENTS

GB 2490605 11/2012
WO WO-2009042563 4/2009
WO WO-2009086489 7/2009

OTHER PUBLICATIONS

U.S. Appl. No. 13/464,964, filed May 5, 2012, Allen, Jeffrey L., et al.
(Continued)

*Primary Examiner* — James S McClellan
(74) *Attorney, Agent, or Firm* — DeLizio Gilliam, PLLC

(57) ABSTRACT

Described herein are processes and devices that integrate social contact identifiers into wagering games. Some embodiments include providing game play elements configured for use in presentation of possible outcomes for a wagering game, wherein the wagering game is associated with a first player account stored on an account server. Some embodiments further include selecting, via one or more processors, a second player account indicated in the first player account as a social contact of a player associated with the first player account. Some embodiments further include, via at least one of the one or more processors, providing a social contact identifier of the second player account for use in the wagering game to represent at least a portion of at least one of the game play elements.

22 Claims, 12 Drawing Sheets

(56) References Cited

U.S. PATENT DOCUMENTS

| | | | | |
|---|---|---|---|---|
| 6,068,552 | A | 5/2000 | Walker et al. | |
| 6,110,041 | A | 8/2000 | Walker et al. | |
| 6,117,009 | A | 9/2000 | Yoseloff | |
| 6,142,872 | A | 11/2000 | Walker et al. | |
| 6,159,096 | A | 12/2000 | Yoseloff | |
| 6,254,483 | B1 | 7/2001 | Acres | |
| 6,342,010 | B1 | 1/2002 | Slifer | |
| 6,350,199 | B1 | 2/2002 | Williams et al. | |
| 6,358,150 | B1 | 3/2002 | Mir et al. | |
| 6,364,765 | B1 | 4/2002 | Walker et al. | |
| 6,394,899 | B1 | 5/2002 | Walker | |
| 6,520,856 | B1 | 2/2003 | Walker et al. | |
| 6,628,939 | B2 | 9/2003 | Paulsen | |
| 6,692,353 | B2 | 2/2004 | Walker et al. | |
| 6,699,125 | B2 | 3/2004 | Kirmse et al. | |
| 6,769,986 | B2 | 8/2004 | Vancura | |
| 6,843,724 | B2 | 1/2005 | Walker et al. | |
| 7,040,987 | B2 | 5/2006 | Walker et al. | |
| 7,169,052 | B2 | 1/2007 | Beaulieu et al. | |
| 7,240,093 | B1 | 7/2007 | Danieli et al. | |
| 7,311,608 | B1 | 12/2007 | Danieli et al. | |
| 7,458,894 | B2 | 12/2008 | Danieli et al. | |
| 7,559,838 | B2 | 7/2009 | Walker et al. | |
| 7,938,727 | B1 | 5/2011 | Konkle | |
| 8,167,712 | B2 | 5/2012 | Sarkar et al. | |
| 2002/0042296 | A1 | 4/2002 | Walker et al. | |
| 2002/0090985 | A1 | 7/2002 | Tochner et al. | |
| 2002/0111209 | A1 | 8/2002 | Walker et al. | |
| 2002/0142846 | A1 | 10/2002 | Paulsen | |
| 2002/0183105 | A1 * | 12/2002 | Cannon et al. | 463/16 |
| 2003/0003988 | A1 | 1/2003 | Walker et al. | |
| 2003/0224852 | A1 * | 12/2003 | Walker et al. | 463/20 |
| 2004/0180712 | A1 | 9/2004 | Forman et al. | |
| 2005/0043092 | A1 | 2/2005 | Gauselmann | |
| 2005/0054438 | A1 | 3/2005 | Rothschild et al. | |
| 2005/0071481 | A1 | 3/2005 | Danieli | |
| 2005/0170890 | A1 | 8/2005 | Rowe et al. | |
| 2005/0209001 | A1 | 9/2005 | Moshal | |
| 2005/0277469 | A1 | 12/2005 | Pryzby et al. | |
| 2005/0277474 | A1 | 12/2005 | Barry | |
| 2005/0289056 | A1 | 12/2005 | Guinn | |
| 2006/0247039 | A1 | 11/2006 | Lerner et al. | |
| 2006/0264257 | A1 | 11/2006 | Jaffe et al. | |
| 2006/0271959 | A1 | 11/2006 | Jacoby et al. | |
| 2007/0015584 | A1 | 1/2007 | Frenkel | |
| 2007/0054728 | A1 | 3/2007 | Hood | |
| 2007/0060380 | A1 | 3/2007 | McMonigle et al. | |
| 2007/0072677 | A1 | 3/2007 | Lavoie et al. | |
| 2007/0077988 | A1 | 4/2007 | Friedman | |
| 2007/0155507 | A1 | 7/2007 | Gatto et al. | |
| 2008/0004097 | A1 | 1/2008 | Maya et al. | |
| 2008/0009344 | A1 | 1/2008 | Graham et al. | |
| 2008/0064492 | A1 | 3/2008 | Oosthoek | |
| 2008/0102916 | A1 | 5/2008 | Kovacs et al. | |
| 2008/0272541 | A1 | 11/2008 | Walker et al. | |
| 2009/0036196 | A1 | 2/2009 | Ansari et al. | |
| 2009/0093290 | A1 | 4/2009 | Lutnick et al. | |
| 2009/0117989 | A1 * | 5/2009 | Arezina et al. | 463/20 |
| 2009/0131163 | A1 | 5/2009 | Arbogast et al. | |
| 2009/0163267 | A1 | 6/2009 | Fine | |
| 2009/0170608 | A1 | 7/2009 | Herrmann et al. | |
| 2010/0019453 | A1 | 1/2010 | Oakes et al. | |
| 2010/0203963 | A1 | 8/2010 | Allen et al. | |
| 2010/0279764 | A1 | 11/2010 | Allen et al. | |
| 2011/0092275 | A1 | 4/2011 | Gagner et al. | |
| 2011/0143830 | A1 * | 6/2011 | Fine | 463/20 |
| 2011/0300925 | A1 | 12/2011 | Adiraju et al. | |
| 2012/0094737 | A1 | 4/2012 | Barclay et al. | |
| 2012/0282995 | A1 | 11/2012 | Allen et al. | |
| 2013/0316818 | A1 | 11/2013 | Earley et al. | |

OTHER PUBLICATIONS

"PCT Application No. PCT/US08/77310 International Preliminary Report on Patentability", Sep. 14, 2010 , 4 pages.
"PCT Application No. PCT/US08/77310 International Preliminary Report on Patentability", Apr. 1, 2010 , 6 pages.
"PCT Application No. PCT/US08/77310 International Search Report", Dec. 8, 2008 , 7 pages.
"PCT Application No. PCT/US08/88381 International Preliminary Report on Patentability", Aug. 16, 2010 , 12 pages.
"PCT Application No. PCT/US08/88381 International Search Report", Feb. 24, 2009 , 10 pages.
"UK Application No. 1208182.4 Examination Report", Sep. 3, 2012, 9 Pages.
"U.S. Appl. No. 12/678,206 Office Action", Mar. 30, 2012 , 21 pages.
"U.S. Appl. No. 12/810,685 Office Action", Aug. 1, 2012 , 12 pages.
"U.S. Appl. No. 12/810,685 Office Action", Dec. 23, 2011 , 15 pages.
Prizehearts, LLC, , "Lotto Love and Pals Available Next Generation Keno/Lottery Software", *24-7 Press Release* Apr. 5, 2006 , 2 pages.
"AU Application No. 2012202623 Examination Report", Apr. 15, 2013 , 8 pages.
"U.S. Appl. No. 13/464,964 Office Action", May 30, 2013 , 21 pages.
"U.S. Appl. No. 12/810,685 Final Office Action", Dec. 26, 2012 , 10 pages.
U.S. Appl. No. 13/826,335, filed Mar. 14, 2013, Earley, Edward Q., et al.
"UK Application No. 1208182.4 Examination Report", Dec. 17, 2013 , 5 pages.
U.S. Appl. No. 14/171,596, filed Feb. 3, 2014, Allen, Jeffrey L., et al.

* cited by examiner

INTEGRATING SOCIAL CONTACT IDENTIFIERS INTO WAGERING GAMES

RELATED APPLICATIONS

This application claims the priority to, and is a continuation application of, U.S. application Ser. No. 12/678,206, filed on Mar. 15, 2010, which is incorporated by reference. The Ser. No. 12/678,206 application claims priority benefit of PCT Application No. PCT/US2008/077310, filed on Sep. 23, 2008, which is incorporated by reference. PCT Application No. PCT/US2008/077310 claims the priority benefit of U.S. Provisional Application No. 60/974,626 filed Sep. 24, 2007, which is incorporated by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to devices that integrate social contact identifiers into wagering games of wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into four sections. The first section provides an introduction to embodiments of the invention, while the second section describes example operating environments. The third section describes example operations performed by some embodiments. The fourth section presents some general comments.

INTRODUCTION

This section provides an introduction to some embodiments of the invention.

Wagering games are expanding in popularity. Many gamers are demanding greater access to wagering games and content related to wagering games. As a result, some wagering game companies have created social network sites that provide a way for wagering game enthusiasts to congregate and share their passion for wagering games.

Figure 1:
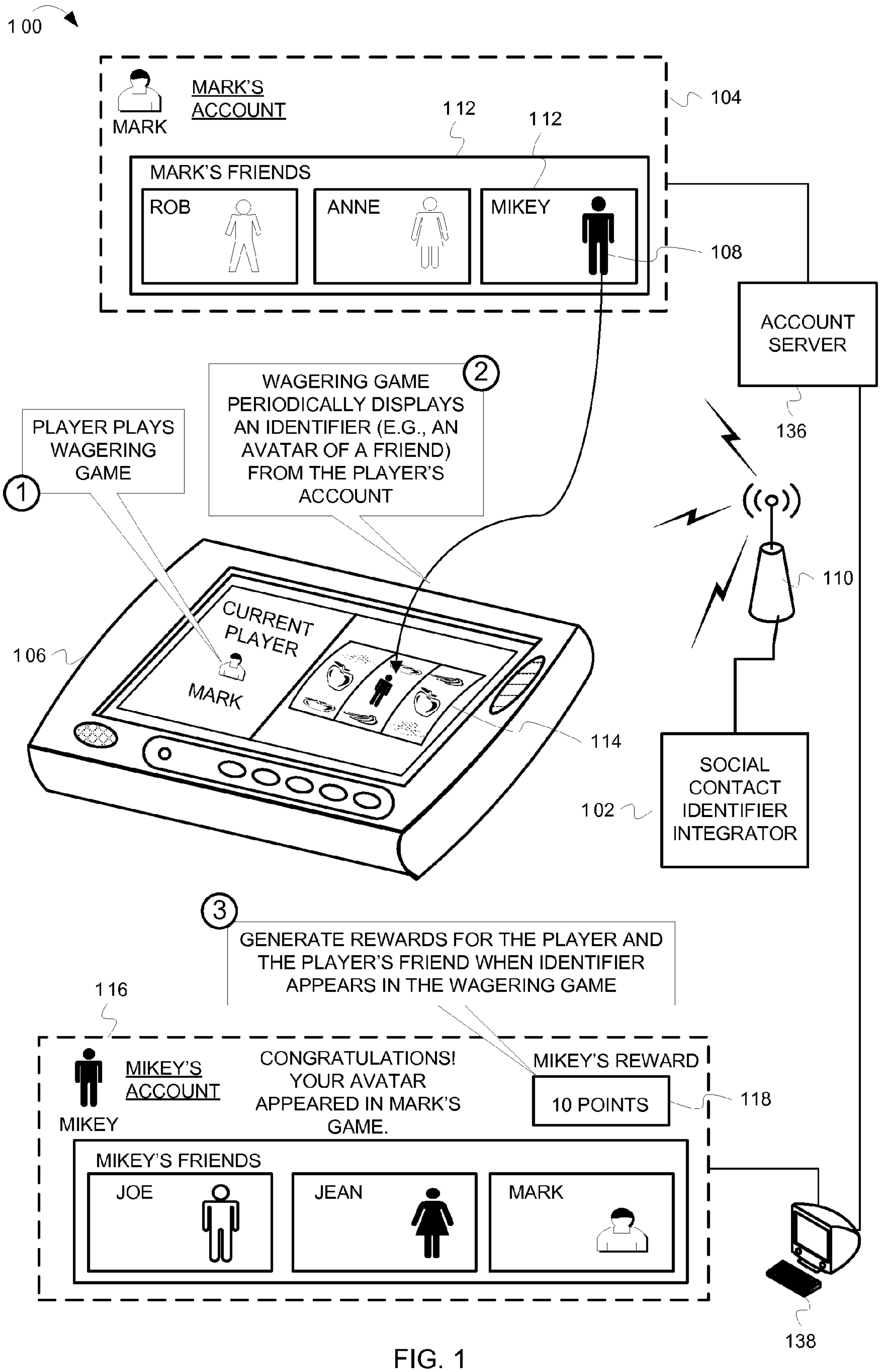
FIG. 1 is an illustration of a social contact identifier integrator 102 within an operating environment 100, according to some embodiments of the invention.

A social network site allows social network users to create online personas. The social network site allows users to create user accounts with one or more unique identifiers that represent the online persona. One example of a unique identifier is an "avatar". Avatars are graphical, "cartoon-like" depictions of a social network persona. These online personas and associated avatars add to the fun of belonging to a social network. Hence, embodiments of the invention enable wagering game companies to combine the fun of social networks with the enjoyment and excitement derived from playing wagering games. FIG. 1 shows how a social contact identifier integrator can integrate social networks with wagering games.

FIG. 1 is an illustration of a social contact identifier integrator 102 within an operating environment 100, according to some embodiments of the invention. In FIG. 1, a social contact identifier integrator 102 ("integrator") is connected, such as through to an access point 110, to a mobile wagering game machine 106 ("mobile machine"). Although FIG. 1 shows the social contact identifier integrator 102 as a stand-alone device, embodiments of the integrator can reside in another network component, such as a social network server, account server, wagering game server, etc.

The mobile machine 106 presents a wagering game. In some embodiments, the wagering game has graphics (e.g., icons) on a display 114. The icons represent elements of the wagering game. In some embodiments, the icons are used to represent the outcome of the game, such as the icons on a slots reel, as shown in FIG. 1. The outcome of the slots game is indicated by the order of the icons shown on the front face of the reels. The integrator 102, can change the icons to integrate an identifier 108 of a social contact associated with the game player. For example, the game player's user account 104 (accessible via a computer 136) contains a list of social contacts, or "friends" 112. The list of friends 112 includes social contact identifiers associated with the friends. Social contact identifiers are any identifier (e.g., visual or audio) that uniquely identifies a social contact. Social contact identifiers can include avatars, pictures, nicknames, sound-bites, jingles, etc. The identifier 108 is an avatar. The avatar identifier 108 is contained on a social contact profile record 107. The integrator 102 can access the list of friends 112 in the player's user account 104 and periodically select an identifier 108 from the list of friends. The integrator 102 can then display the identifier 108 in the wagering game. For example, the integrator 102 can display the avatar identifier 108 in place of a reel icon.

By displaying the avatar identifier 108 in the wagering game, the integrator 102 has integrated a reference to one of the player's friends into the wagering game. Therefore, the integrator 102 combines a fun element of social networks into the fun and excitement of wagering games. In addition, the integrator 102 can further enhance the experience by providing rewards to the friends whose identifier appeared in the wagering game while rewarding the game player as well. For example, the integrator 102 can generate a reward and assign it to an account 116 belonging to the friend whose identifier was integrated into the wagering game. When the friend accesses the account 116 via a computer 138, or wagering game, the friend can see the reward 118 displayed on the account 116. The player can also be rewarded. For example, when the friend's identifier 108 appeared in the wagering game, the mobile machine 106 could treat the identifier 108 as a "wild card" type of icon. The wild card icon could represent any of the normal icons that appear, thus potentially affecting the outcome of the game. For instance, if a row of three apple icons were necessary for a "win" of the wagering game, a row with two apple icons and a "wild card" identifier 108 would be equivalent to three apples icons. Therefore, the player would win the game. Furthermore, the integrator 102 can also provide rewards to the player's social network account.

According to some embodiments of the invention, the social contact identifier integrator 102 can provide a host of different rewards. The following non-exhaustive list enumerates some possible rewards:

- allowing the reward recipient to see more information on a friend's profile record;
- assigning a reward recipient additional friends. The integrator 102 could search for social contacts with similar likes, interests, etc., and assign one of those social contacts to the reward recipient's account;
- expanding the list of potential friends that a reward recipient currently has (if the friend list is limited). More friends could result in more potential reciprocal rewards for the player;
- increasing social status points for the reward recipient. A social status point could represent a degree of social standing within a social network;
- providing free spins or plays on a wagering game;
- providing double-friend prizes;
- providing introductions to famous friends;
- providing casino tokens;
- providing sweepstakes entries;
- providing introductions to specific social networks;
- providing increases in reward values; and
- providing invitations to high roller games and activities.

Although FIG. 1 describes some embodiments, the following sections describe many other features and embodiments.

Example Operating Environments

This section describes example operating environments and networks and presents structural aspects of some embodiments. More specifically, this section includes discussion about wagering game networks, social contact identifier integrator architectures, wagering game machine architectures, wagering game machine communications networks, social network features, and mobile wagering game machines.

Example Wagering Game Network

Figure 2:
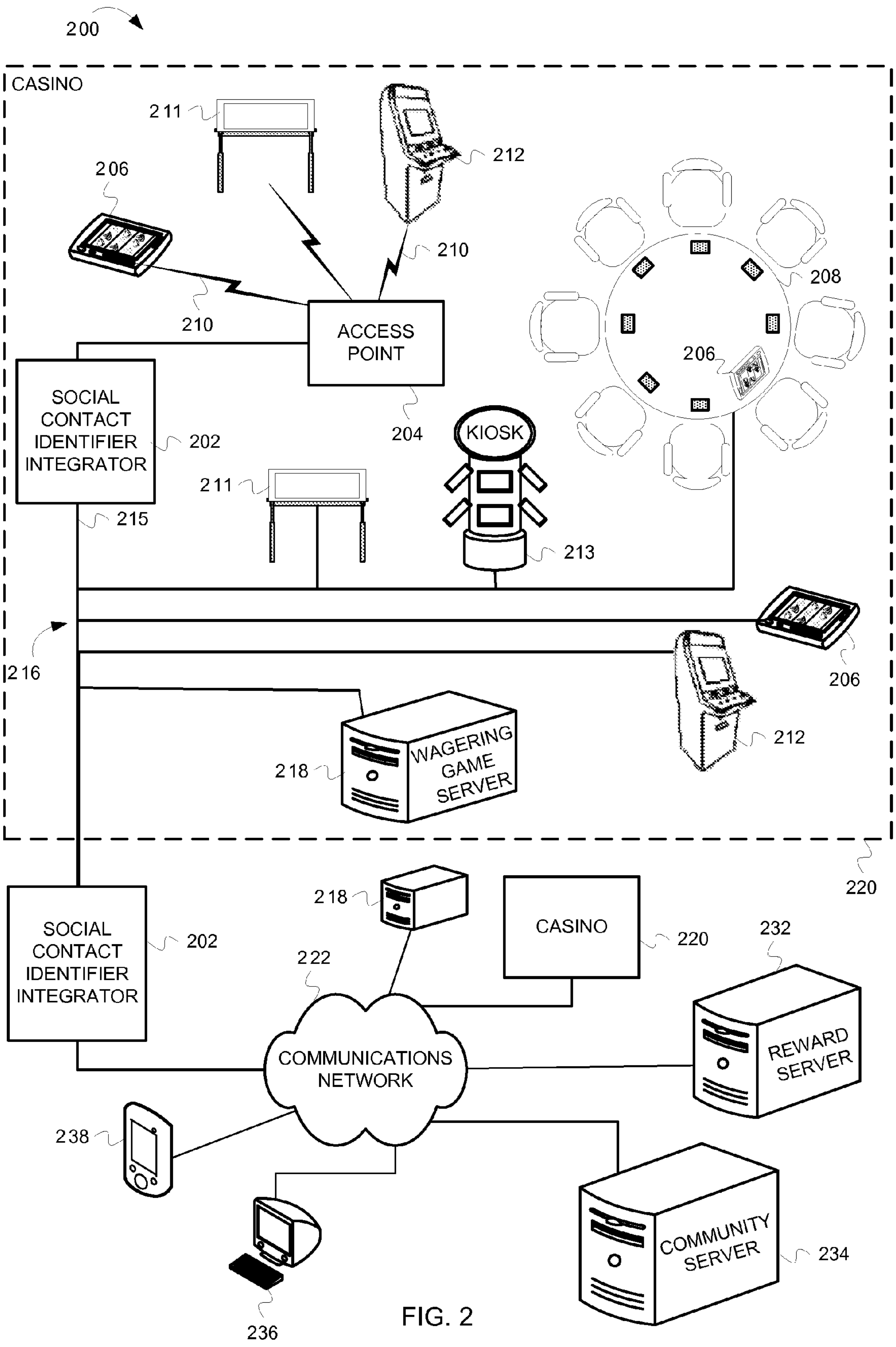
FIG. 2 is an illustration of a wagering game network 200, according to some embodiments of the invention.

FIG. 2 is an illustration of a wagering game network 200, according to some embodiments of the invention. In FIG. 2, the wagering game network 200 includes a plurality of casinos 220 connected to a communications network 222. Each casino 220 includes a local area network 216, which includes an access point 204, one or more servers 218, and wagering game machines 206, 211, 212. In one embodiment, the local area network 216 may also include specific types of servers 218, such as a wagering game server, a promotions server, a player information server, a management server, or other servers not shown herein, such as social networking servers, progressive servers, player tracking servers, file servers, web servers, application servers, database servers, and casino and player account servers. There are many other devices, in other embodiments, that are not shown but that may exist in a wagering game network (e.g., routers, switches, monitoring equipment, etc.). The access point 204 provides wireless communication links 210 with wagering game machines 206, 211, 212. The local area network 216 may also include wired communication links 215 to connect to servers 218, wireless access point 204, wagering game machines 206, 211, 212, one or more docking stations 208 and one or more kiosks 213 for storing mobile machines. The wired and wireless communication links can employ any suitable connection technology, such as Bluetooth, 801.11, Ethernet, public switched telephone networks, SONET, etc. In some embodiments, the servers 218 can serve wagering games and distribute content to devices located in other casinos 220 or at other locations on the communications network 222.

The wagering game machines 206, 211, 212 described herein can take any suitable form, such as floor standing models (e.g., 212), handheld mobile units (e.g., 206), bar-top models, workstation-type console models, surface computing machines (e.g., 211), etc. Further, the wagering game machines 206, 212 can be primarily dedicated for use in conducting wagering games, or can include non-dedicated devices, such as mobile phones, personal digital assistants, personal computers, etc.

In some embodiments, wagering game machines 206, 211, 212 and wagering game servers 218 work together such that wagering game machines 206, 211, 212 can be operated as a thin, thick, or intermediate client. For example, one or more elements of game play may be controlled by the wagering game machines 206, 212 (client) or the wagering game servers 218 (server). Game play elements can include executable game code, lookup tables, configuration files, game outcome, audio or visual representations of the game, game assets or the like. In a thin-client example, the wagering game server 218 can perform functions such as determining game outcome or managing assets, while the wagering game machines 206, 211, 212 can present a graphical representation of such outcome or asset modification to the user (e.g., player). In a thick-client example, the wagering game machines 206, 211, 212 can determine game outcomes and communicate the outcomes to the wagering game server 218 for recording or managing a player's account.

In some embodiments, either the wagering game machines 206, 211, 212 (client) or the wagering game server(s) 218 can provide functionality that is not directly related to game play. For example, account transactions and account rules may be managed centrally (e.g., by the wagering game server(s) 218) or locally (e.g., by the wagering game machines 206, 211, 212). Other functionality not directly related to game play may include power management, presentation of advertising, software or firmware updates, system quality or security checks, etc.

The wagering game network 200 also includes a reward server 232, a community server 234, and one or more client devices 236, 238. The wagering game network 200 also includes a social contact identifier integrator 202. The social contact identifier integrator 202 can integrate social contact identifiers into wagering games. The social contact identifier integrator 202 may be internal or external to a casino 220 and may interact with any suitable wagering game network component to integrate social contact identifiers into wagering games, to assign rewards to reward recipients' accounts, and to send notification messages to reward recipients' accounts and devices. In some embodiments, the social contact identifier integrators 202 can reside inside any of the network components (e.g., wagering game server 218, community server 234, etc.)

Any of the wagering game network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Social Contact Identifier Integrator Architecture

Figure 3:
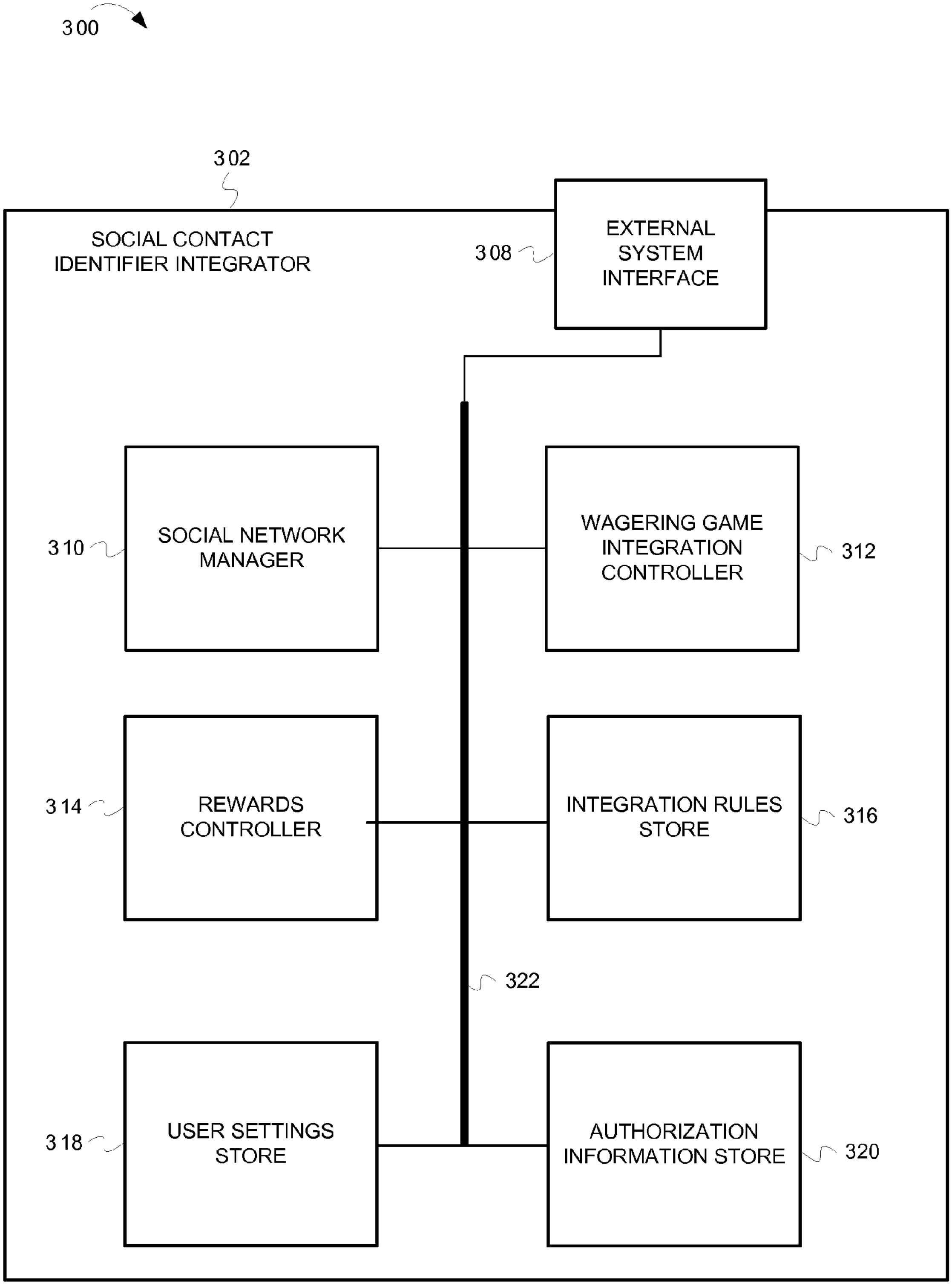
FIG. 3 is an illustration of a social contact identifier integrator architecture 300, according to some embodiments of the invention.

FIG. 3 is an illustration of a social contact identifier integrator architecture 300, according to some embodiments of the invention. In FIG. 3, the social contact identifier integrator architecture 300 includes a social network manager 310 configured to control access to accounts on a social network. For example, the social network manager 310 can access user accounts on the social network to obtain social identifiers. The social network manager can also read and modify user settings, assign social relationships, etc.

In FIG. 3, the social contact identifier integrator architecture 300 also includes a wagering game integration controller 312 configured to control the integration of social network user account identifiers into a wagering game.

The social contact identifier integrator architecture 300 also includes a rewards controller 314 configured to control the assignment of rewards to user accounts, to notify user accounts of rewards, and to allow user accounts redeem rewards.

The social contact identifier integrator architecture 300 also includes an integration rules store 316 configured to store rules regarding the integration of social network user account identifiers into wagering games.

The social contact identifier integrator architecture 300 also includes a user settings store 318 configured to notify user accounts of rewards according to user settings.

The social contact identifier integrator architecture 300 also includes an authorization information store 320 configured to store unique identification information (user account names, passwords, security keys, serial numbers, media access control addresses, etc.) that the social identifier integrator 302 can use to verify and control authorization of social networks, control commands, etc.

Example Wagering Game Machine Architecture

Figure 4:
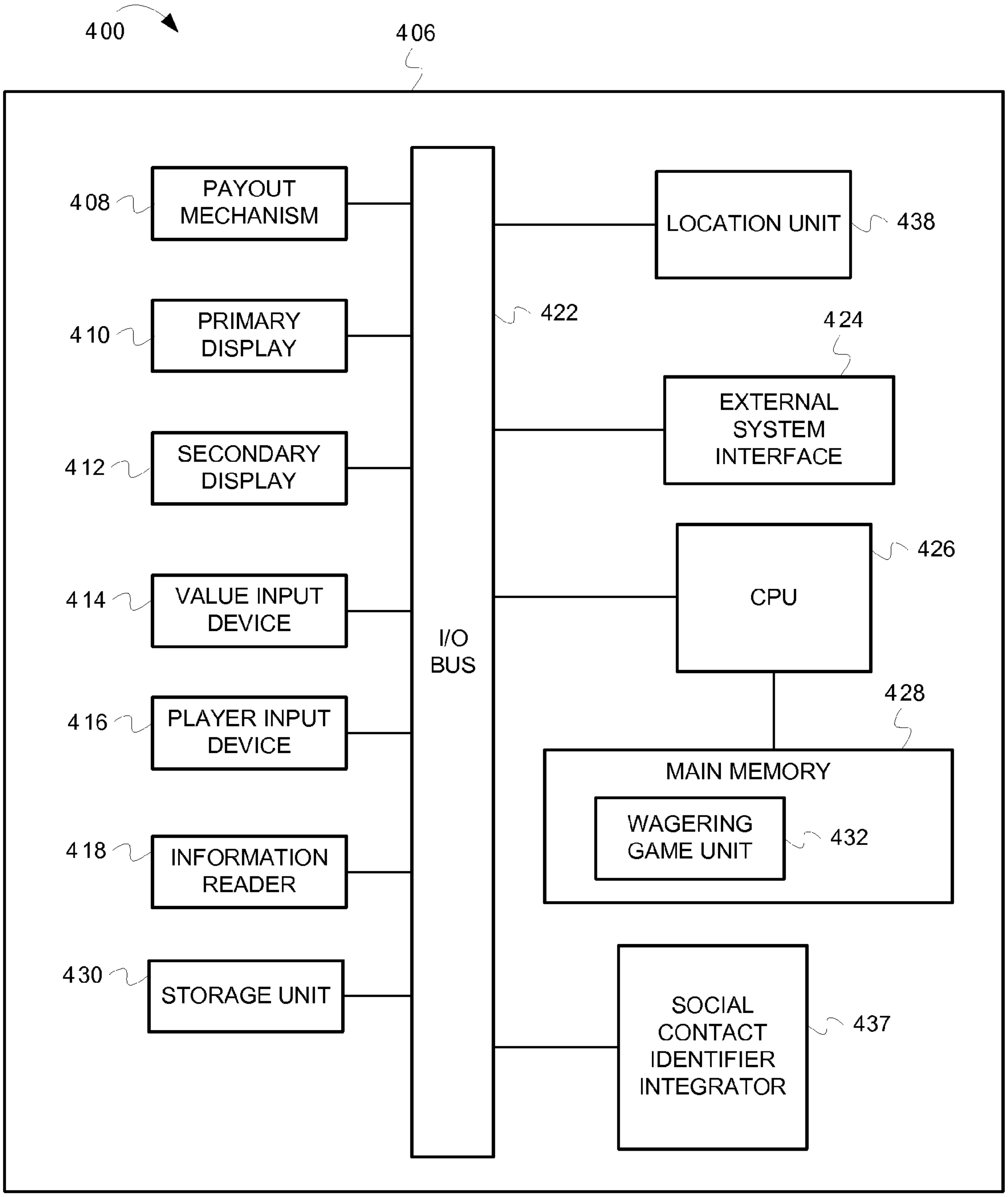
FIG. 4 is an illustration of a wagering game machine architecture 400, according to some embodiments of the invention.

FIG. 4 is an illustration of a wagering game machine architecture 400, according to some embodiments of the invention. In FIG. 4, the wagering game machine architecture 400 includes a wagering game machine 406, which includes a central processing unit (CPU) 426 connected to main memory 428. The CPU 426 can include any suitable processor, such as an Intel® Pentium processor, Intel® Core 2 Duo processor, AMD Opteron™ processor, or UltraSPARC processor. The main memory 428 includes a wagering game unit 432. In one embodiment, the wagering game unit 432 can present wagering games, such as video poker, video black jack, video slots, video lottery, reel slots, etc., in whole or part.

The CPU 426 is also connected to an input/output ("I/O") bus 422, which can include any suitable bus technologies, such as an AGTL+ frontside bus and a PCI backside bus. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks). The external system interface 424 can include logic for exchanging information over wired and wireless networks (e.g., 802.11g transceiver, Bluetooth transceiver, Ethernet transceiver, etc.)

The I/O bus 422 is also connected to a location unit 438. The location unit 438 can create player information that indicates the wagering game machine's location/movements in a casino. In some embodiments, the location unit 438 includes a global positioning system (GPS) receiver that can determine the wagering game machine's location using GPS satellites. In other embodiments, the location unit 438 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 4, in some embodiments, the location unit 438 is not connected to the I/O bus 422.

In one embodiment, the wagering game machine 406 can include additional peripheral devices and/or more than one of each component shown in FIG. 4. For example, in one embodiment, the wagering game machine 406 can include multiple external system interfaces 424 and/or multiple CPUs 426. In one embodiment, any of the components can be integrated or subdivided.

In one embodiment, the wagering game machine 406 includes a social contact identifier integrator 437. The social contact identifier integrator 437 can process communications, commands, or other information, where the processing can integrate social contact identifiers into wagering games, provide rewards, send notifications of the rewards, and control rewards redemption.

Furthermore, any component of the wagering game machine 406 can include hardware, firmware, and/or machine-readable media including instructions for performing the operations described herein.

Integrating Social Networks and Player Accounts

Figure 5:
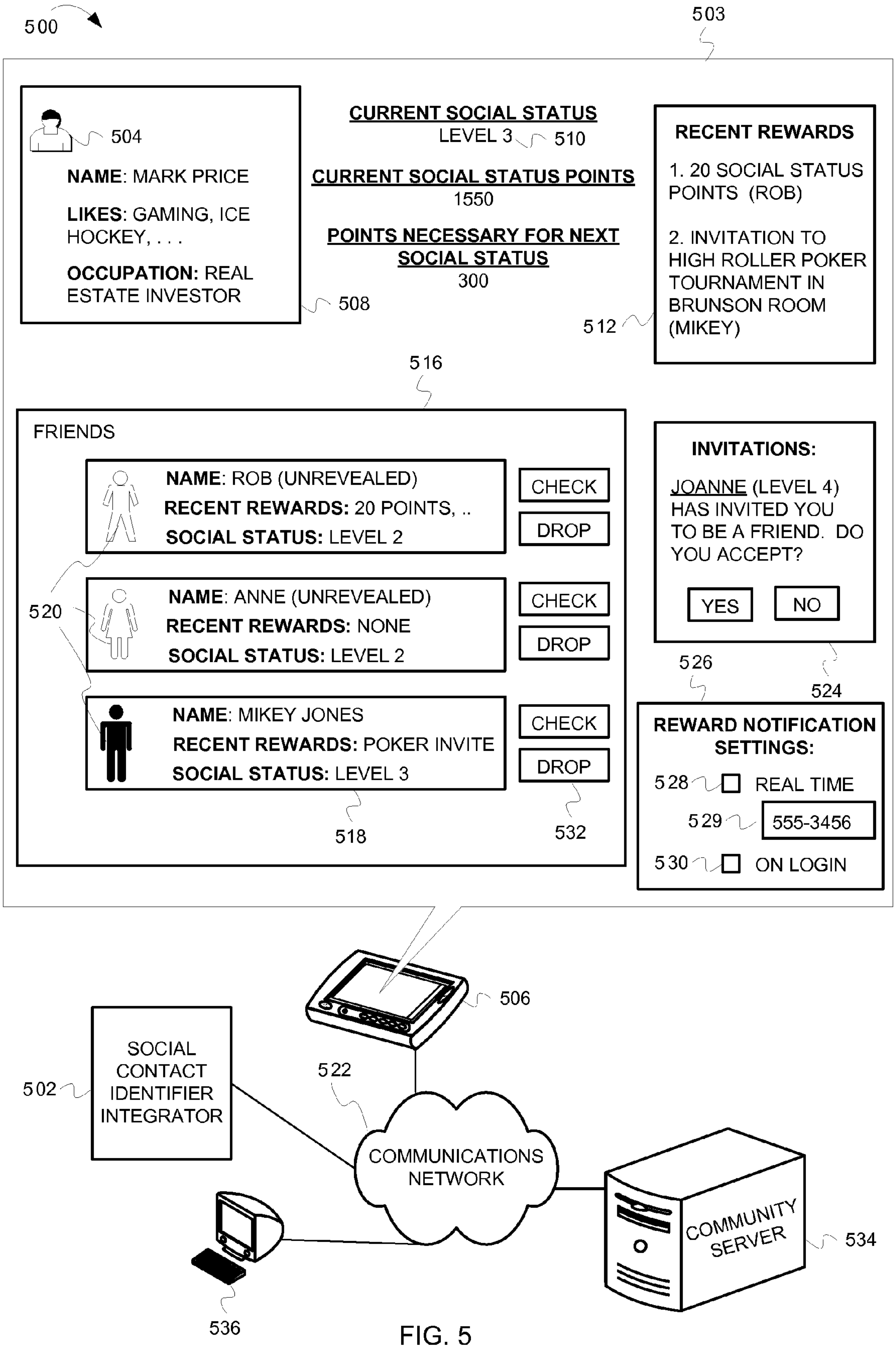
FIG. 5 is an illustration of a integrating social networks and player accounts, according to some embodiments of the invention.

FIG. 5 is an illustration of a integrating social networks and player accounts, according to some embodiments of the invention. In FIG. 5, a wagering game machine 506 is connected to a communications network 522 in an operating environment 500. The wagering game machine 506 can be used to access a social network account 503 according to some embodiments. The social network account 503 contains a social contact card 508 with information about the social network account owner. The social contact card 508 also includes an identifier 504, like an avatar, to help identify the account owner as a social contact on the social network. The social network account 503 also includes social status information 510 that can be used to track the account owner's social status on the social network. The social network account 503 also includes a notification screen 512 to notify the account owner of any recent rewards assigned to the account owner.

The social network account 503 also includes a list of social contact "friends" 516, which can contain one or more social contact cards 518. These social contact cards 518 contain information about other social network account owners that have a social relationship to the owner of the social network account 503. The social contact cards could be card shaped, cubed shaped, etc. Information on the cards can be static or dynamic and can include links to information. The social contact cards can have information on the front, back, or any surface. Each of the social contact cards 518 can include identifiers 520, such as avatars, that help to uniquely identify the social contact. The social network account 503 also includes additional buttons 532, such as to remove a social contact card 518 from the list of friends or to check to see which friends have received rewards. In some embodiments, the list of friends 516 might be limited to those that have played wagering games within a set period of time.

The social network account 503 also includes an invitation screen for inviting or accepting an invitation from another social network account to be added to the list of friends 516. The social network account 503 also includes a notification settings box 526 for storing user settings about notifying the account owner of rewards. For example, the notification settings box 526 can include buttons 528, 530 indicating how the account owner should be notified of rewards (e.g., in real-time, upon login). A field 529 indicates a location for contact information (e.g., cell phone number, email address, etc.) for where to send the notification message.

The social network account 503 can be created and stored on a community server 534, also connected to the communications network 522. Any social network accounts associated with social contacts in the friends list 516 can also be stored on the community server 534. A social contact identifier integrator 502 can work in conjunction with the community server 534 to access and modify social network accounts. Other devices connected to the communications network 522, such as the computer 536, can access the social network account 503 via the communication network 522.

Integrating Social Contact Identifiers into a Wagering Game

Figure 6:
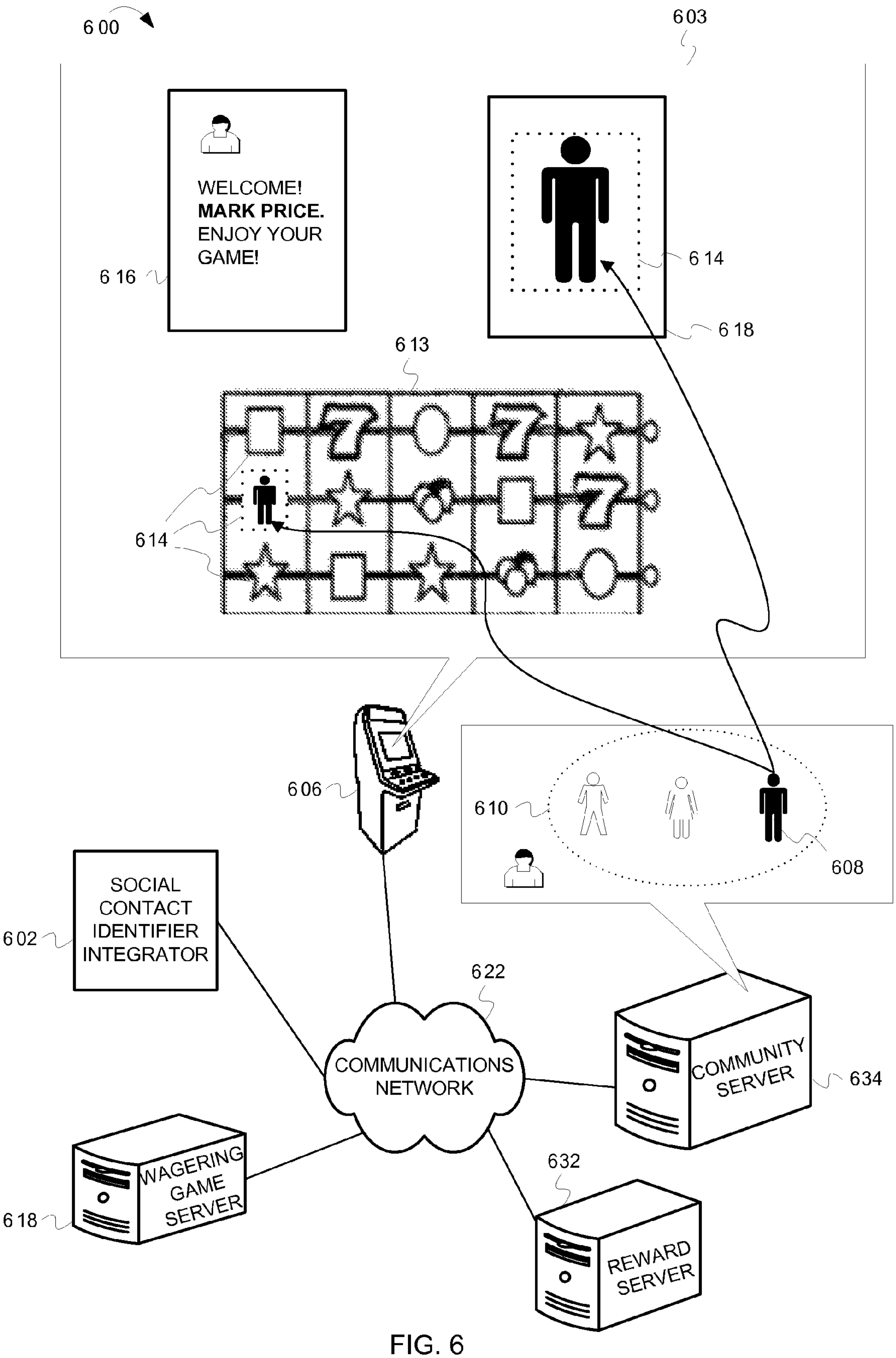
FIG. 6 is an illustration of integrating social contact identifiers into a wagering game, according to some embodiments of the invention.

FIG. 6 is an illustration of integrating social contact identifiers into a wagering game, according to some embodiments of the invention. In FIG. 6, a wagering game machine 606 is connected to a communications network 622 in an operating environment 600. The wagering game machine 606 can be used to present a wagering game console 603. The wagering game console 603 includes a primary game display 613, an account display 616, and a secondary game display 618. The account display 616 includes information about the player. This information can be contained within a server, such as a wagering game server 618 or a community server 634. The wagering game server 618 can work in conjunction with the wagering game machine 606 to present the information shown on the wagering game console 603. The primary game display 614 and secondary game display 618 contain game play elements 614 that are used as part of a wagering game. A social contact identifier integrator 602 can gather social contact identifiers 608 into a group 610 from the player's social network account. The social contact identifier integrator 602 can then select and display one of the social contact identifiers in the wagering game console 603 as part of the game play. For example, the social contact identifier integrator 602 can insert the social contact identifier 608 into the primary game display 613 or secondary game display 618 in a way that integrates, in whole or part, with a game play element 614. The secondary game display 618 can be used to provide other information, such as bonus game information, game results, points, etc., that is tied to the information presented in the primary game display 613.

The social contact identifier integrator 602 can assign rewards to social network accounts on the community server 634. The social contact identifier integrator 602 can work in conjunction with a reward server 632 to generate, assign, store and redeem rewards.

Figure 7:
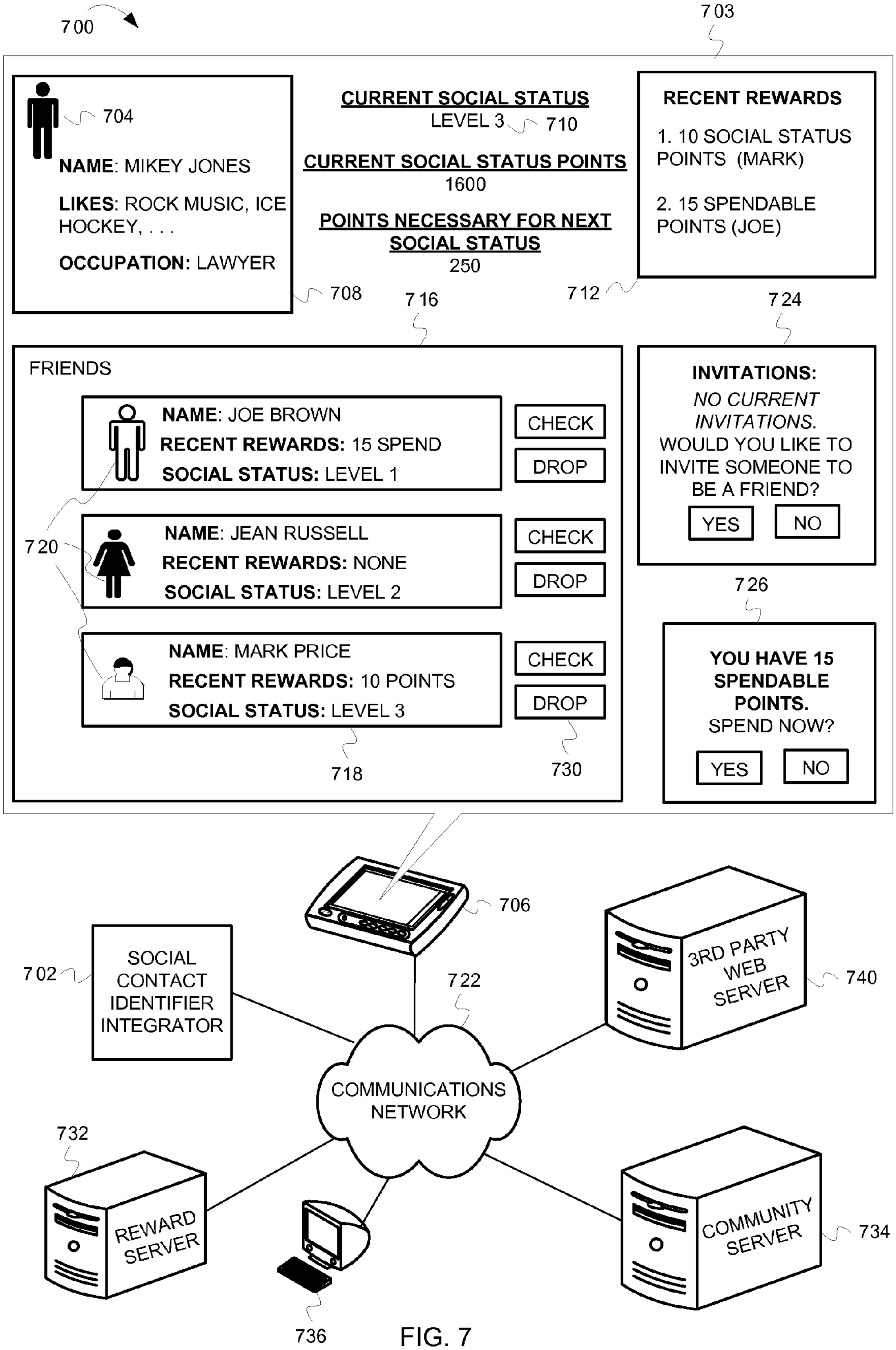
FIG. 7 is an illustration of controlling the assignment, notification and redemption of rewards obtained from a wagering game, according to some embodiments of the invention.

Controlling Assignment, Notification and Redemption of Rewards Obtained from a Wagering Game FIG. 7 is an illustration of controlling the assignment, notification and redemption of rewards obtained from a wagering game, according to some embodiments of the invention. In FIG. 7, a wagering game machine 706 is connected to a communications network 722 in an operating environment 700. The wagering game machine 706 is can be used to view a social network account 703, very similar to the network account in FIG. 5. The social network account 703 contains a social contact card 708 with an identifier 704. The social network account 703 includes a notification screen 712 to notify the account owner of any recent rewards assigned to the account owner. The social network account 703 includes a list of social contact "friends" 716, which can contain one or more social contact cards 718. In other examples, however, the social network account 703 includes social contacts that are not necessarily "friends", but are individuals that are assigned as a contact, groups of contacts, etc. Each of the social contact cards 718 can include identifiers 720, such as avatars, that help to uniquely identify the social contact. The social network account 703 includes additional buttons 730, such as to remove a social contact card 718 from the list of friends or to check to see which friends have received rewards. The social network account 703 includes an invitation screen for inviting or accepting an invitation from another social network account to be added to the list of friends 716. The social network account can also include a notification settings box (not shown) for storing user settings about notifying the account owner of rewards.

The social network account 703 can be created and stored on a community server 734, also connected to the communications network 722. Any social network accounts associated with social contacts in the friends list 716 can also be stored on the community server 734. A social contact identifier integrator 702 can work in conjunction with the community server 734 to access and modify social network accounts. Other devices connected to the communications network 722, such as the computer 736, can access the social network account 703 via the communication network 722.

In addition, the social network account 703 includes a rewards redemption screen 726 to allow a reward recipient to redeem rewards, such as "spendable" points, or other forms of spendable value. The reward server 732 can work in conjunction with network devices, like the wagering game machine 706 or the social contact identifier integrator 702 to allow a reward recipient to redeem awards. In some embodiments, rewards can be spent in a casino on wagering game activities, like playing wagering games or ordering casino services. In some embodiments, the rewards can be spent, transferred, exchanged, etc., for products or services that are not wagering game related. For example, the computer 736 can connect to the community server 734 to access the spendable rewards in the social network account 703. Then, the computer 736 can spend the rewards on a third party web site, hosted by a third party web server 740.

According to some embodiments of the invention, the social contact identifier integrator 702, or other network devices, can allow reward recipients to use rewards in many ways. The following non-exhaustive list enumerates some possible ways rewards can be used.

- Rewards can be used to enhance a reward recipient into a higher social network level (e.g., social strata).
- Rewards can be used to enhance avatars.
- Rewards can be used to expand a list of friends.
- Reward recipients can used to attend casino events.
- Reward recipients and their friends can transfer the rewards.
- Rewards can be added to a prize pot that can be shared with other friends.
- Reward recipients can barter rewards with others.

Notifying Social Network Accounts of Rewards

Figure 8:
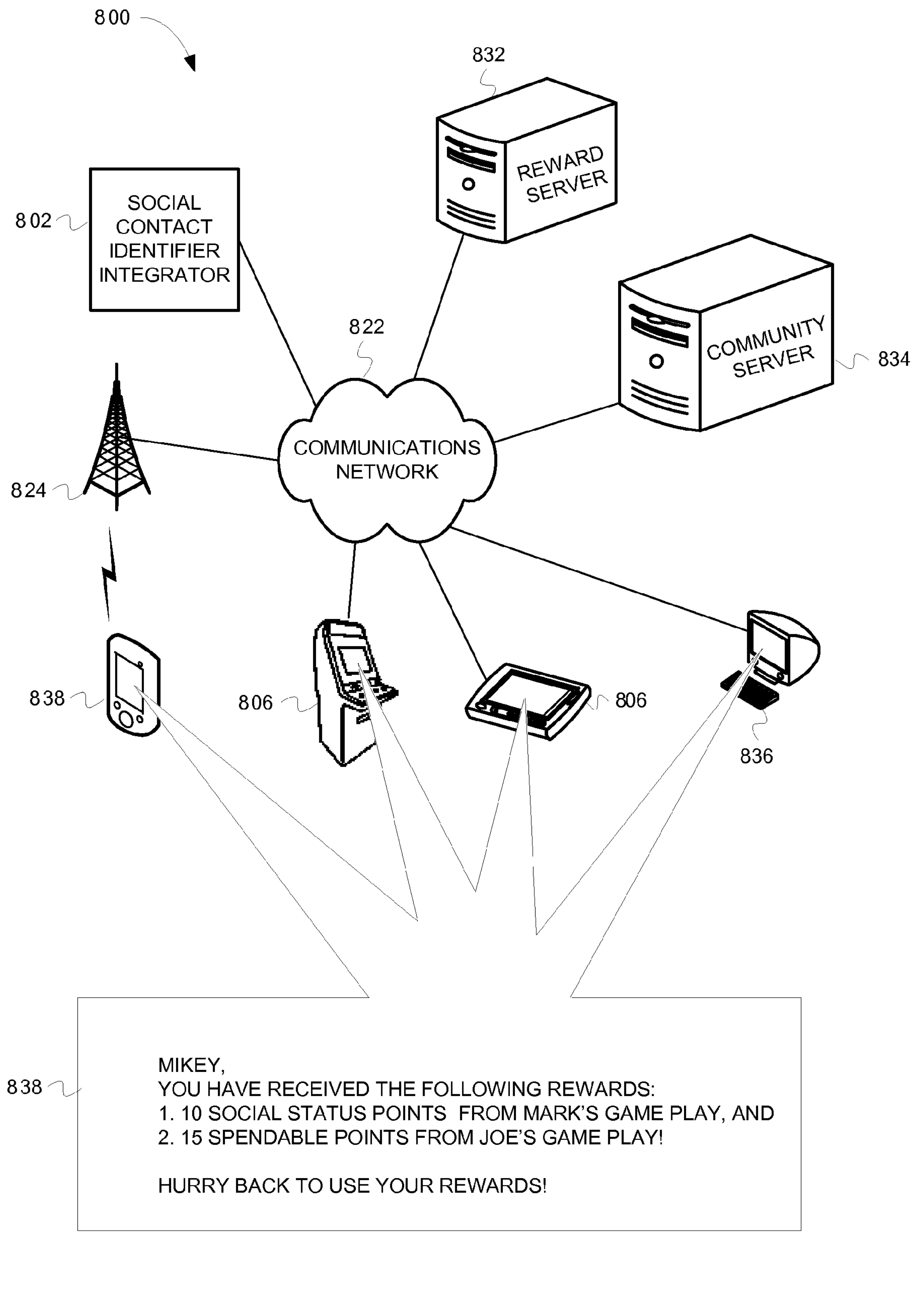
FIG. 8 is an illustration of notifying social network accounts of rewards, according to some embodiments of the invention.

FIG. 8 is an illustration of notifying social network accounts of rewards, according to some embodiments of the invention. In FIG. 8, a social contact identifier integrator 802 is connected to a communication network 822 in an operating environment 800. A reward server 832 and a community server 834 are also connected to the communications network. Several client devices are also connected to the communications network 822, including wagering game machines 806 and a computer. A wireless device 838 is also connected via a wireless transmission unit 824. The social contact identifier integrator 802 can send a notification message 838 to the devices 806, 836 and 838. The social contact identifier integrator can send the notification message 838 in real-time, immediately after a reward had been assigned to a reward recipient's account. In some embodiments, the message 838 is not sent in real-time, but can be sent to a community server 834 to hold and display when a user account is accessed via the client devices 806, 838, 836.

Although FIG. 5 through FIG. 8 show embodiments of the integrator as a stand-alone network component, it can reside in any suitable network component.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 9:
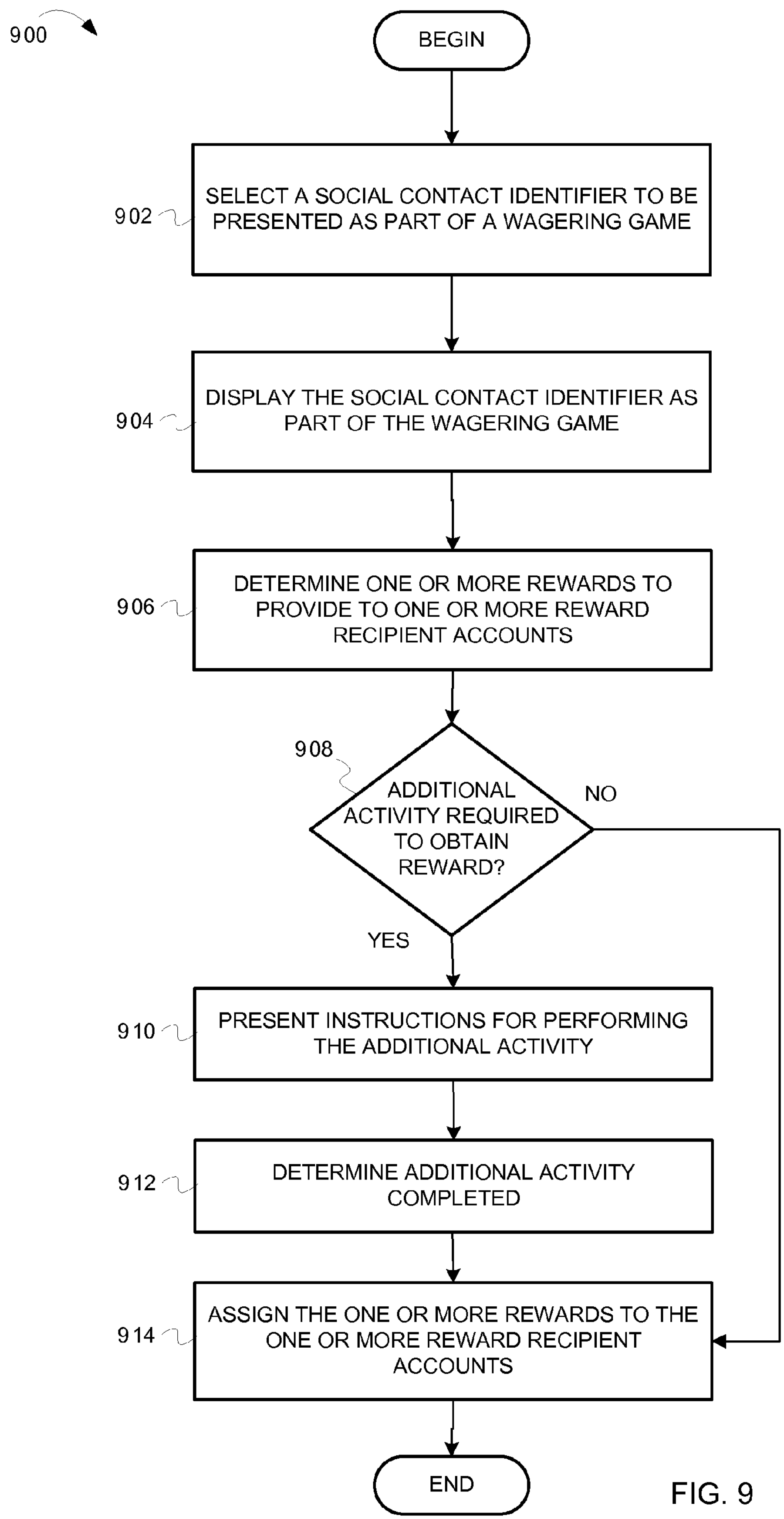
FIG. 9 is a flow diagram 900 illustrating integrating a social contact identifier into a wagering game, according to some embodiments of the invention.

FIG. 9 is a flow diagram illustrating integrating a social contact identifier into a wagering game, according to some embodiments of the invention. In FIG. 9, the flow 900 begins at processing block 902, where a social contact identifier integrator selects a social contact identifier to be presented as part of a wagering game. The social contact identifier integrator can select social contact identifiers from a social network account, a network user account, or any other location where a list or collection of social contacts are stored. Social contact identifiers are any identifier, whether visual, audio, or other, that uniquely identifies a social contact. Social contact identifiers can include avatars, pictures, nicknames, number sequences, or any other visual representation that identifies a social contact of a wagering game player. Social contact identifiers can include jingles, catch-phrases, sound-bites, a spoken name, or any other sound that identifies a social contact of a wagering game player. In some embodiments, the social contact identifier can be a combination of both visual and audio identifiers.

The flow 900 continues at processing block 904, where the social contact identifier integrator displays the social contact identifier as part of the wagering game. The social contact identifier integrator can randomly displays the social contact identifier as part of the game elements. For example, the social contact identifier integrator can display the social contact identifier on any part of the wagering game machine that presents the wagering game, such as on game reels, on game characters, on bonus sections, on point trackers, and on results displays. The social contact identifier integrator can also display the social contact identifier on machines that are connected to the wagering game machine, such as on peripheral devices, external monitors, etc.

The flow 900 continues at processing block 906, where the social contact identifier integrator determines one or more rewards to provide to one or more reward recipient accounts. In some embodiments, the reward recipients can be the player and the social contact whose identifier appeared in the wagering game. Rewards can be varied, as described further above. A rewards server can assist the social contact identifier integrator in determining rewards. The social contact identifier integrator can determine the values of rewards based on various factors. For example, the social contact identifier integrator can determine reward values based on the habits of a user. For example, the social contact identifier integrator can increase reward values to incentivize play on a single game type that a user plays frequently. The social contact identifier integrator could also increase reward values, such as with a bonus amount, for new games to incentivize players to try new games. On the other hand, the social contact identifier integrator can decrease reward values to discourage play on a single game. Furthermore, the social contact identifier integrator can determine more than one reward. The rewards can be separate and distinct from each other. For example, the social contact identifier integrator can determine one reward to provide two separate and distinct rewards to provide at once—one to the game player's account and one reward to provide to the account of the social contact whose identifier appeared in the wagering game.

The flow 900 continues at processing block 908, where the social contact identifier integrator determines whether additional activity is required to obtain the reward. For example, the social contact identifier integrator could require a performer (e.g., the player, the potential reward recipient, any other person or group of people associated with the reward, etc.), to perform additional steps to obtain the reward. The social contact identifier integrator could require the performer to perform the additional activity outside of the wagering game. For example, the social contact identifier integrator could require a performer to perform a scavenger hunt to obtain the reward. The scavenger hunt could include requiring that the performer play a certain series of games. Hence, the activity could be performed without having to leave a game terminal. In some embodiments, the social contact identifier integrator could require the activity performer, or group of performers, to perform activities beyond a casino, on the Internet, or anywhere else the outcome of the activity can be reported electronically to the social network identifier integrator. If the social contact identifier integrator requires the performer to perform additional activity before assigning the reward, the process continues at block 910. Otherwise, the process continues at block 914.

The flow 900 continues at processing block 910, where the social contact identifier integrator presents instructions for performing the additional activity. The social contact identifier integrator can provide instructions to the performer about how to obtain the determined reward.

The flow 900 continues at processing block 912, where the social contact identifier integrator determines that the additional activity is completed. The social contact identifier integrator can monitor the required additional activity to look for a predetermined outcome that indicates completion of the additional activity. Once the performer achieves the outcome, then the social contact identifier integrator will recognize the outcome and determine that the additional activity is complete.

The flow 900 continues at processing block 914, where the social contact identifier integrator assigns the one or more rewards to the one or more reward recipient accounts. The social contact identifier integrator can assign the rewards to reward recipients in different ways. If the reward recipient has a user accounts on a social network, the social contact identifier integrator can assign the reward to the user account. In some embodiments, however, the social contact identifier integrator can assign the rewards in other ways, such as via email messages, through printed vouchers or coupons, etc. Hence, a specific user account is not required.

Figure 10:
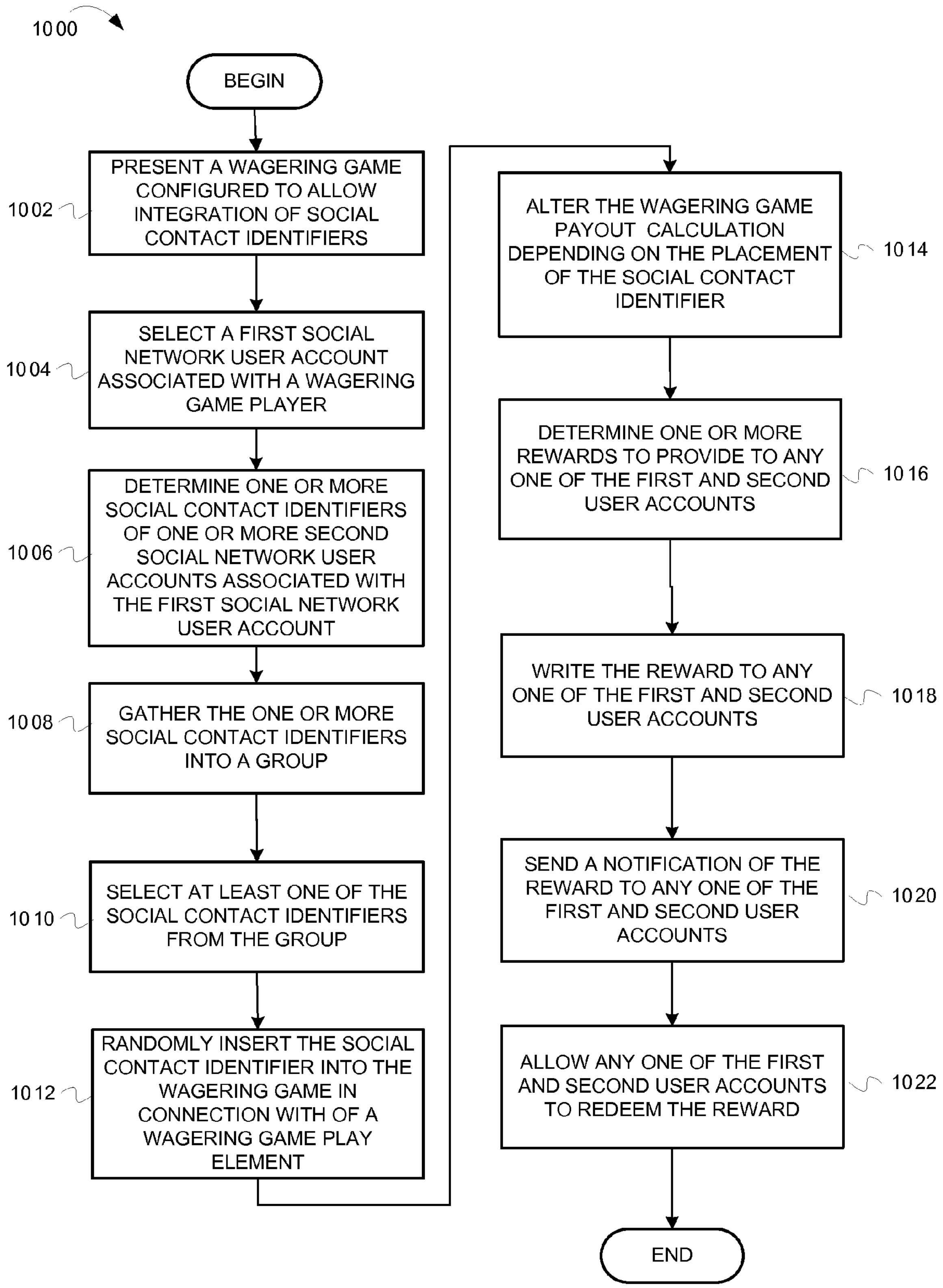
FIG. 10 is a flow diagram 1000 illustrating integrating a social contact identifier into a wagering game, according to some embodiments of the invention.

FIG. 10 is a flow diagram illustrating integrating a social contact identifier into a wagering game, according to some embodiments of the invention. In FIG. 10, the flow 1000 begins at processing block 1002, where a social contact identifier integrator presents a wagering game configured to allow integration of social contact identifiers.

The flow 1000 continues at processing block 1004, where the social contact identifier integrator selects a first social network user account associated with a wagering game player.

The flow 1000 continues at processing block 1006, where the social contact identifier integrator determines one or more social contact identifiers of one or more second social network user accounts associated with the first social network user account.

The flow 1000 continues at processing block 1008, where the social contact identifier integrator gathers the one or more social contact identifiers into a group. In some embodiments, the social contact identifier integrator can gather the identifiers on a client. For example, the social contact identifier integrator could download the social contact identifiers onto the client to create the group on the client. To ensure that resources on the client are not over burdened, the social contact identifier integrator could download social contact identifiers only during less client intense activity. On the other hand, in some embodiments, the social contact identifier integrator can gather the identifiers on a server. The social contact identifier integrator can gather the social contact identifiers one by one from a community server into a group that is left on a wagering game server. The wagering game server can be in constant communication with the community server to update the group of social contact identifiers if new social contacts are added or removed from a player's account.

The flow 1000 continues at processing block 1010, where the social contact identifier integrator selects at least one of the social contact identifiers from the group. The social contact identifier integrator can randomly select the social contact identifier from the group. The social contact identifier integrator can utilize a random selection algorithm that watches the progress of the wagering game. As game play progresses, when a graphical game play element is going to appear on the wagering game display screen, the social contact identifier integrator decide to use a graphical social contact identifier, like an avatar, in place of the graphical game play element. The social contact identifier integrator can select the social contact identifier based on "mystery events", which are criteria unknown to the wagering game player. Mystery events can range from pure randomness to other criteria built into the wagering game programming.

The flow 1000 continues at processing block 1012, where the social contact identifier integrator randomly inserts the social contact identifier into the wagering game in connection with a wagering game play element. For example, some wagering games utilize reels, or depictions of reels, with icons on the reels that line up to determine a game outcome. For example, a wagering game may contain icons of cherries, bananas and apples on the reels. The social contact identifier integrator can randomly select and replace the depiction of the normal icon (e.g. cherry, apple, banana, etc.) with the social contact identifier (e.g. an avatar). As a result, for the game play, such as for one or more spins of the reel, the identifier appears in place of the normal icon. In some embodiments, the social contact identifier integrator might not entirely replace the normal icon, but could integrate the social contact identifier with the graphic (e.g., place an image of an avatar on the apple). In some embodiments, the social contact identifier may appear in a secondary display, such as part of a game bonus in connection with the wagering game. In some embodiments, the replacement may not be random.

The flow 1000 continues at processing block 1014, where the social contact identifier integrator alters the wagering game payout calculation depending on the placement of the social contact identifier. In some embodiments, the wagering game has play elements that determine the game outcome. For example, as described in the paragraph above, some wagering games utilize reels, or depictions of reels, with icons on the reels that line up to determine a game outcome. For example, as described previously, a wagering game may contain icons of cherries, bananas and apples. The object of the wagering game may be to line up three cherries in a row, which would mean a "win", and therefore a payout. Suppose that a player spins the reels and the social contact identifier integrator randomly replaces an apple icon with a social contact identifier. The game rules could treat the social contact identifier as a "wild card" type of icon, meaning that it could be used as a cherry icon if desired. Therefore, if two cherries lined up in the win row, and if a social contact identifier filled in the third icon spot on that row, then the game play would result in a "win", and the payout would be affected. The payout is affected because the apple icon would not have resulted in a win. However, because the "wild card" social contact identifier appeared, and was treated as a wild card type of icon, then the game did result in a win. If, however, a social contact identifier integrator randomly inserted the social contact identifier over the apple icon, but the social contact identifier did not line up in the "win" row, then the social contact identifier would not have affected the outcome of the game. Nevertheless, because the social contact identifier was inserted into the game play, it could still be used to generate some form of reward, as described in block 1014.

The flow 1000 continues at processing block 1016, where the social contact identifier integrator determines one or more rewards to provide to any one of the first and second user accounts. Specifically, the social contact identifier integrator can determine one or many types of rewards, as described further above. The reward recipient can be any one of the first and second social network user accounts, specifically the social network user account that is a related to the inserted social network identifier.

The flow 1000 continues at processing block 1018, where the social contact identifier integrator writes the reward to any one of the first and second user accounts.

The flow 1000 continues at processing block 1020, where the social contact identifier integrator sends a notification message of the reward to any one of the first and second user accounts. In some embodiments, the social contact identifier integrator notifies the recipients of the rewards according to user settings set within the recipients social network user account. For example, the reward recipient's account can have a user setting that indicates that the social network identifier integrator should notify the reward recipient immediately of any rewards. The user settings could also indicate contact instructions, such as phone number to which the social network identifier integrator can send a text message. As a result, the social network identifier integrator could read that setting and accordingly send a notification of the reward via text message to the reward recipient's cell phone. Hence, the reward recipient can earn and receive notifications of rewards even when the reward recipient is not connected to the wagering game network.

The flow 1000 continues at processing block 1022, where the social contact identifier integrator allows any one of the first and second user accounts to redeem the reward. The social contact identifier integrator can work in conjunction with a rewards server to allow reward recipients to redeem rewards through their user accounts. Rewards can be redeemed in many ways, some of which are described in FIG. 7.

Figure 11:
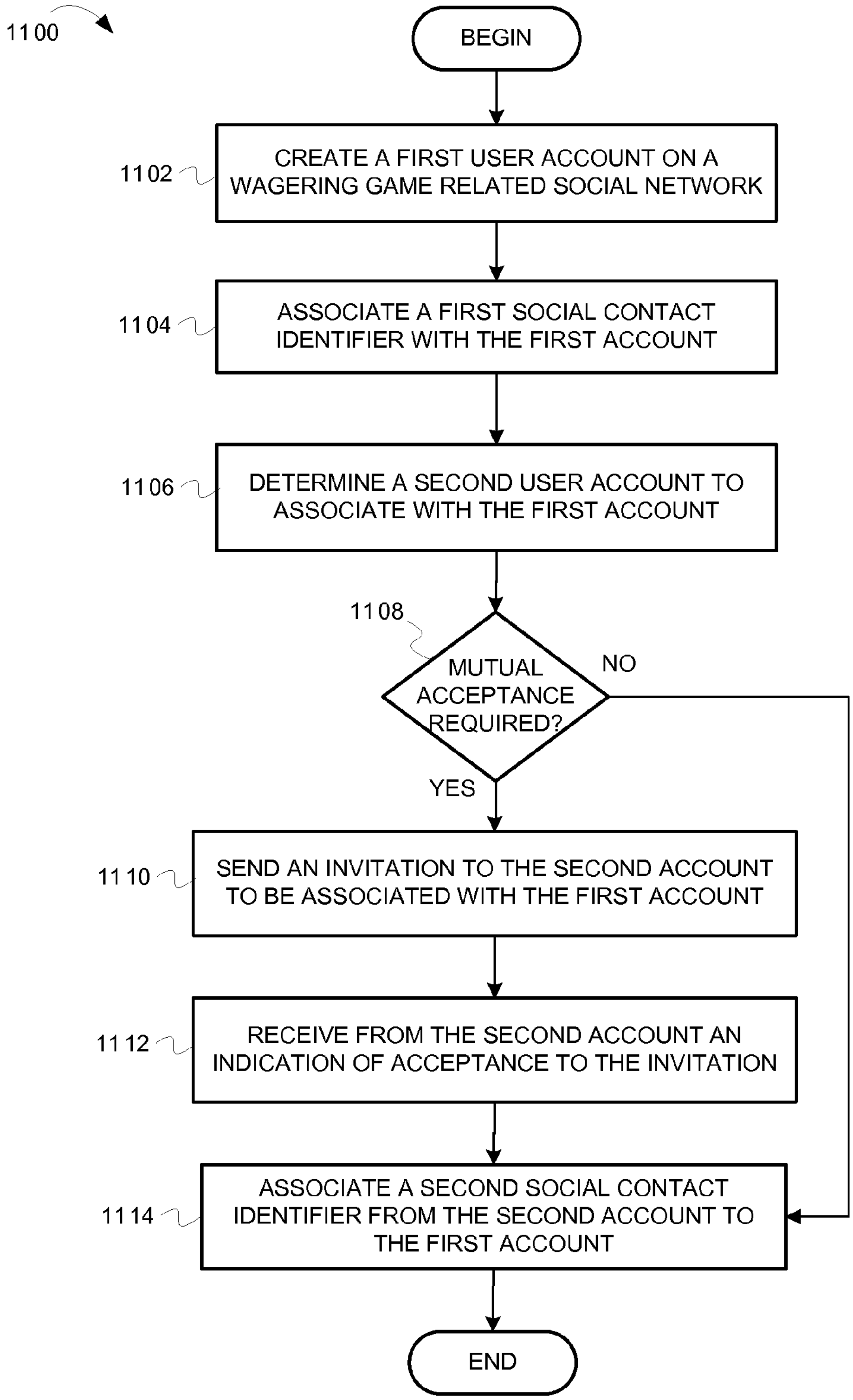
FIG. 11 is a flow diagram 1100 illustrating assigning social contacts in a wagering game network, according to some embodiments of the invention.

FIG. 11 is a flow diagram illustrating assigning social contacts in a wagering game network, according to some embodiments of the invention. In FIG. 11, the flow 1100 begins at processing block 1102, where a community server creates a first user account on a wagering game related social network.

The flow 1100 continues at processing block 1104, where the community server associates a first social contact identifier with the first account. The first social contact identifier identifies a user associated with the first account. The first social contact identifier can be a unique identifier of the user. For example, the social contact identifier can be an avatar chosen by the user assigned to the first user account.

The flow 1100 continues at processing block 1106, where the community server determines a second user account to associate with the first account.

The flow 1100 continues at processing block 1108, where the community server determines whether mutual acceptance is required by the first and second accounts before associating the second user account to the first user account. In some embodiments, both user accounts need to be in agreement regarding any associations, and the process continues at block 1110. In other embodiments, however, where mutual agreement is not required, the process continues at block 1114.

The flow 1100 continues at processing block 1110, where the community server sends an invitation to the second user account to be associated with the first user account.

The flow 1100 continues at processing block 1112, where the community server receives from the second account an indication of acceptance to the invitation. If there is no mutual acceptance, then the social contact identifier integrator can send a message to the inviting user account that the invitee user account rejected the invitation. If, however, there is mutual acceptance, the process continues.

The flow 1100 continues at processing block 1114, where the community server associates a second social contact identifier from the second account to the first account. The second social contact identifier from the second account identifies a user associated with the second account. The second social contact identifier can be a unique identifier of the social contact. For example, the social contact identifier can be an avatar chosen by the user assigned to the second user account.

Example Mobile Wagering Game Machine

Figure 12:
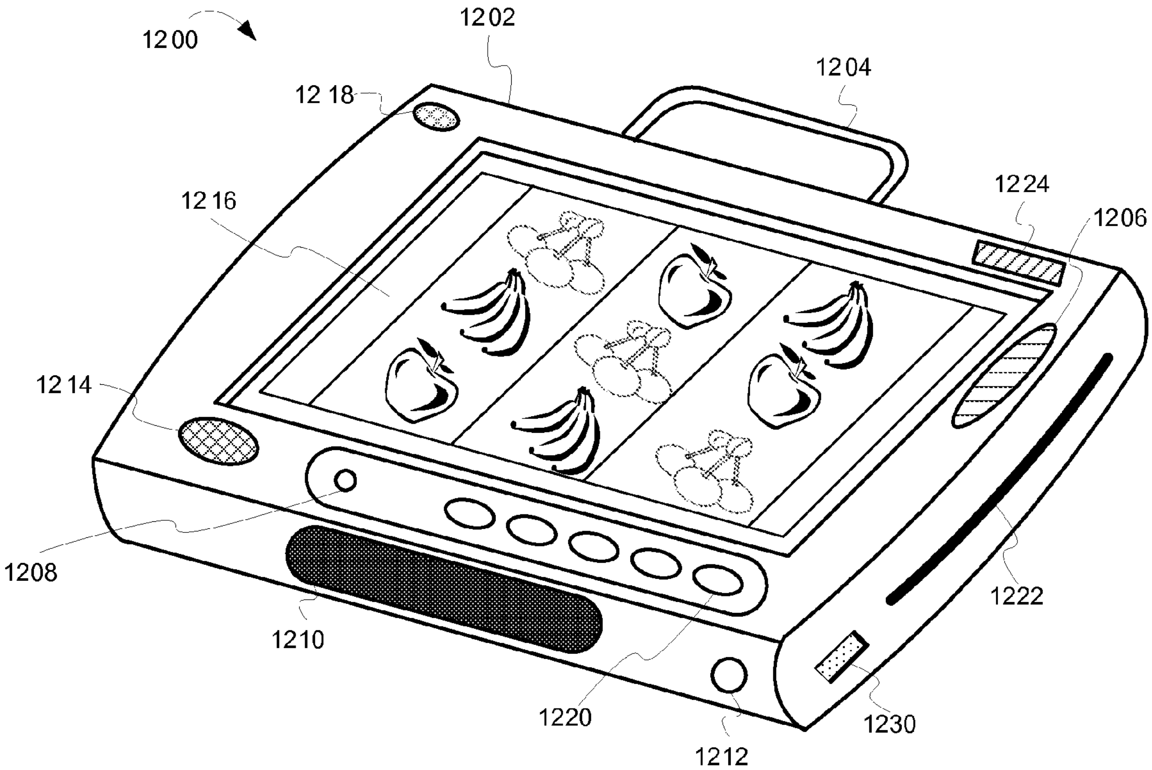
FIG. 12 is an illustration of a mobile wagering game machine 1200, according to some embodiments of the invention.

FIG. 12 is an illustration of a mobile wagering game machine 1200, according to some embodiments of the invention. In FIG. 12, the mobile wagering game machine 1200 includes a housing 1202 for containing internal hardware and/or software such as that described above vis-à-vis FIG. 4. In one embodiment, the housing has a form factor similar to a tablet PC, while other embodiments have different form factors. For example, the mobile wagering game machine 1200 can exhibit smaller form factors, similar to those associated with personal digital assistants. In one embodiment, a handle 1204 is attached to the housing 1202. Additionally, the housing can store a foldout stand 1210, which can hold the mobile wagering game machine 1200 upright or semi-upright on a table or other flat surface.

The mobile wagering game machine 1200 includes several input/output devices. In particular, the mobile wagering game machine 1200 includes buttons 1220, audio jack 1208, speaker 1214, display 1216, biometric device 1206, wireless transmission devices 1212 and 1224, microphone 1218, and card reader 1222. Additionally, the mobile wagering game machine can include tilt, orientation, ambient light, or other environmental sensors.

In one embodiment, the mobile wagering game machine 1200 uses the biometric device 1206 for authenticating players, whereas it uses the display 1216 and speakers 1214 for presenting wagering game results and other information (e.g., credits, progressive jackpots, etc.). The mobile wagering game machine 1200 can also present audio through the audio jack 1208 or through a wireless link such as Bluetooth.

In one embodiment, the wireless communication unit 1212 can include infrared wireless communications technology for receiving wagering game content while docked in a wager gaming station. The wireless communication unit 1224 can include an 802.11G transceiver for connecting to and exchanging information with wireless access points. The wireless communication unit 1224 can include a Bluetooth transceiver for exchanging information with other Bluetooth enabled devices.

In one embodiment, the mobile wagering game machine 1200 is constructed from damage resistant materials, such as polymer plastics. Portions of the mobile wagering game machine 1200 can be constructed from non-porous plastics which exhibit antimicrobial qualities. Also, the mobile wagering game machine 1200 can be liquid resistant for easy cleaning and sanitization.

In some embodiments, the mobile wagering game machine 1200 can also include an input/output ("I/O") port 1230 for connecting directly to another device, such as to a peripheral device, a secondary mobile machine, etc. Furthermore, any component of the mobile wagering game machine 1200 can include hardware, firmware, and/or machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed:

1. A computer-implemented method comprising:

determining a first player account and one or more other player accounts that are social contacts of the first player account;

detecting, during a wagering game, an event triggering use of a social contact identifier in the wagering game;

selecting, from the one or more other player accounts, a second player account;

determining a social contact identifier associated with the second player account; and via at least one or more processors, providing the social contact identifier associated with the second player account to represent at least a portion of a game play element of the wagering game.

2. The computer-implemented method of claim 1, wherein the providing the social contact identifier associated with the second player account to represent a game play element of the wagering game, comprises using the social contact identifier associated with the second player account as a wild symbol for the wagering game.

3. The computer-implemented method of claim 1 further comprising:

assigning a value to the social contact identifier associated with the second player account, wherein the value assigned to the social contact identifier associated with the second player account results in a winning outcome for the wagering game.

4. The computer-implemented method of claim 1, wherein the providing the social contact identifier associated with the second player account to represent the game play element of the wagering game, comprises replacing the game play element of the wagering game with the social contact identifier associated with the second player account.

5. The computer-implemented method of claim 4, wherein the replacing the game play element of the wagering game with the social contact identifier associated with the second player account represents a change to an outcome of the wagering game.

6. The computer-implemented method of claim 1, wherein the providing the social contact identifier associated with the second player account to represent a game play element of the wagering game, comprises integrating the social contact identifier associated with the second player account with the game play element of the wagering games.

7. The computer-implemented method of claim 1, further comprising:

determining a reward to award to the second player account based on the providing the social contact identifier associated with the second player account; and notifying the second player account of the reward.

8. The computer-implemented method of claim 1, wherein the selecting, from the one or more other player accounts, the second player account is in response to detecting input, associated with the first player account, wherein the input indicates a selection of the second player account.

9. The computer-implemented method of claim 1, wherein the social contact identifier associated with the second player account comprises one or more of an avatar, a picture, user account name, a nickname, an identifying number, a serial number, a number sequence, a network address, a sound bite, a jingle, a catch-phrase, a spoken name, and an identifying sound.

10. One or more non-transitory machine-readable storage devices having instructions stored thereon, which when executed by a set of one or more processors causes the set of one or more processors to perform operations comprising:

determining a first player account and one or more other player accounts that are social contacts of the first player account;

detecting, during a wagering game, an event triggering use of a social contact identifier in the wagering game;

selecting, from the one or more other player accounts, a second player account;

determining a social contact identifier associated with the second player account;

providing the social contact identifier associated with the second player account for use instead of a game play element of the wagering game, wherein use of the social contact identifier instead of the game play element of the wagering game represents a change to an outcome of the wagering game.

11. The one or more non-transitory machine-readable storage devices of claim 10, said operations further comprising: assigning a value to the social contact identifier associated with the second player account, wherein the value assigned to the social contact identifier associated with the second player account results in a winning outcome for the wagering game.

12. The one or more non-transitory machine-readable storage devices of claim 10, wherein use of the social contact identifier associated with the second player account within the wagering game affects a pay-out calculation of the wagering game.

13. The one or more non-transitory machine-readable storage devices of claim 10, said operations further comprising:

prior to the selecting the second player account, updating, in response to user input, a list of the one or more other player accounts that are social contacts of the first player account; and selecting the second player account from the list of the one or more other player accounts.

14. The one or more non-transitory machine-readable storage devices of claim 10, wherein the social contact identifier associated with the second player account comprises one or more of an avatar, a picture, user account name, a nickname, an identifying number, a serial number, a number sequence, a network address, a sound bite, a jingle, a catch-phrase, a spoken name, and an identifying sound.

15. A system comprising:

at least one processor; and at least one memory unit configured to store instructions, wherein the instructions, when executed by the at least one processors, cause the system to detect a first outcome for a wagering game, wherein the wagering game includes at least one game play element configured for use in presentation of the first outcome for the wagering game, wherein the wagering game is associated with a first player account, select a second player account indicated in the first player account as a social contact of a player associated with the first player account, and replace the at least one game play element with a social contact identifier of the second player account such that the first outcome changes to a second outcome different from the first outcome.

16. The system of claim 15, wherein the instruction to replace the at least one game play element with the social contact identifier of the second player account such that the first outcome changes to a second outcome different from the first outcome, comprises an instruction to use the social contact identifier as a wild symbol for the wagering game.

17. The system of claim 15, wherein the second player account is one of a plurality of player accounts indicated in the first player account and wherein the instruction to select the second player account comprises an instruction to select the second player account, from the plurality of player accounts, according to criteria other than randomness.

18. The system of claim 15, wherein the at least one memory unit is configured to store instructions which, when executed by the at least one processors, cause the system to gather a plurality of social contact identifiers from a social network server, store the plurality of social contact identifiers on a client device, and select the social contact identifier from the group of social contact identifiers stored on the client device.

19. An apparatus comprising:

at least one processor; and a memory unit configured to store instructions which, when executed by the at least one processor, cause the apparatus to determine a first player account and one or more other player accounts that are social contacts of the first player account, detect, during a wagering game, an event triggering use of a social contact identifier in the wagering game, select, from the one or more other player accounts, a second player account, determine a social contact identifier associated with the second player account, and integrate the social contact identifier associated with the second player account with at least one game play element configured for use in presentation of an outcome of the wagering game.

20. The apparatus of claim 19, wherein the memory unit is configured to store instructions which, when executed by the at least one processor, further cause the apparatus to integrate the social contact identifier associated with the second player account to represent a change to the outcome of the wagering game.

21. The apparatus of claim 19, wherein the memory unit is configured to store instructions which, when executed by the at least one processor, further cause the apparatus to use the social contact identifier associated with the second player account as a wild symbol for the wagering game.

22. The apparatus of claim 19, wherein the memory unit is configured to store instructions which, when executed by the at least one processor, further cause the apparatus to assign a value to the social contact identifier associated with the second player account, wherein the value assigned to the social contact identifier associated with the second player account results in a winning outcome for the wagering game.

* * * * *